United States Patent [19]

Kim

[11] Patent Number: 5,457,516

[45] Date of Patent: Oct. 10, 1995

[54] ENERGY SAVING IMAGE-FORMING APPARATUS AND CONTROL METHOD THEREFOR

[75] Inventor: Yong-Geun Kim, Suwon, Rep. of Korea

[73] Assignee: SamSung Electronics Co., Ltd., Suwon, Rep. of Korea

[21] Appl. No.: 297,894

[22] Filed: Aug. 30, 1994

[30] Foreign Application Priority Data

Oct. 23, 1993 [KR] Rep. of Korea .................. 22100/1993

[51] Int. Cl.$^6$ .................................................. G03G 21/00
[52] U.S. Cl. ........................................ 355/208; 355/204
[58] Field of Search ..................... 355/208, 203, 355/204, 206, 285, 282, 289, 290, 200, 202; 219/216

[56] References Cited

U.S. PATENT DOCUMENTS

| | | |
|---|---|---|
| 4,618,245 | 10/1986 | Fukushi . |
| 4,642,448 | 2/1987 | Shigemura . |
| 4,678,316 | 7/1987 | Abuyama . |
| 4,745,436 | 5/1988 | Matsuura ............................. 355/206 |
| 4,841,440 | 6/1989 | Yonezu . |
| 4,878,092 | 10/1989 | Arai . |
| 5,241,349 | 8/1993 | Nagasaka . |
| 5,321,478 | 6/1994 | Nakamura et al. ..................... 355/285 |
| 5,361,124 | 11/1994 | Rowe ...................................... 355/208 |
| 5,420,668 | 5/1995 | Okano .................................... 355/206 |

*Primary Examiner*—Matthew S. Smith
*Attorney, Agent, or Firm*—Robert E. Bushnell

[57] ABSTRACT

An energy saving image forming apparatus and a control method therefor may be automatically activated when a user does not use the image forming apparatus for a predetermined period of time, by thereafter initiating a primary energy saving mode where power to a primary energy saving circuit portion of the apparatus is turned off. The primary energy saving circuit portion includes components within the apparatus that consume large amounts of energy, namely the heat lamp and ventilating fan. The secondary energy saving circuit portion includes components within the apparatus other than those included in the primary energy saving circuit portion. To achieve even greater energy savings, a secondary energy saving mode is established in response to a user input. During the secondary energy saving mode, power to the primary energy saving circuit portion and a secondary energy saving circuit portion is turned off. While in the secondary energy saving mode, a reactivation key may be entered by the user. Entry of the reactivation key initiates a warm-up operation to bring the apparatus to a print ready state. The apparatus and method may be widely applied in many types of image forming apparatuses to prevent unnecessary power consumption.

22 Claims, 9 Drawing Sheets

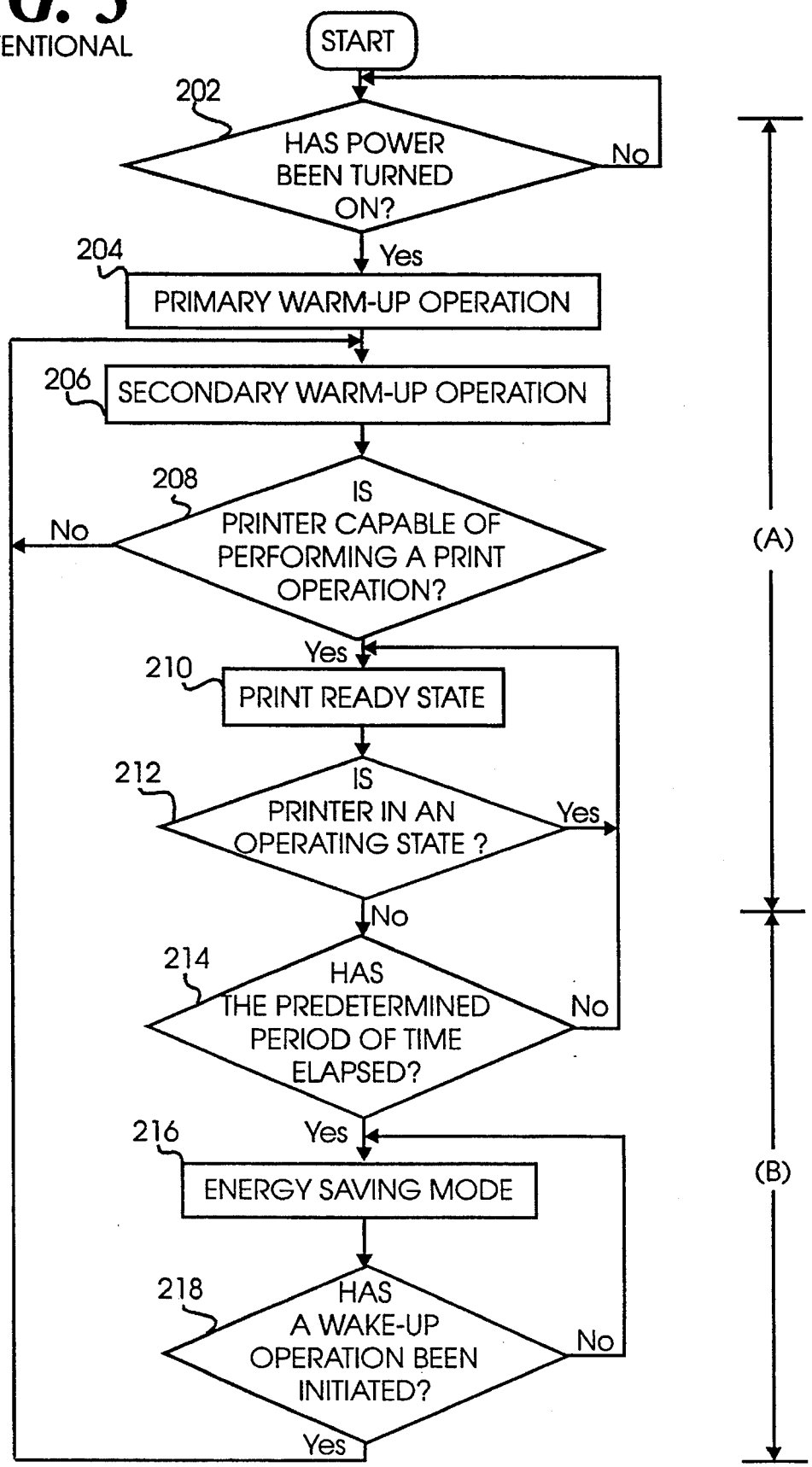
FIG. 3
CONVENTIONAL

ENERGY SAVING IMAGE-FORMING APPARATUS AND CONTROL METHOD THEREFOR

CROSS-REFERENCE TO RELATED APPLICATIONS

This applications makes reference to, incorporates herein and claims all benefits available under 35 U.S.C. §119 from my patent application entitled Energy Saving Image-forming Apparatus And Control Method For Therefor earlier filed in the Korea Industrial Property Office on 23 Oct. 1993 and duly assigned Ser. No. 1993/22100.

BACKGROUND OF THE INVENTION

The present invention relates to an energy saving image-forming apparatus, and more particularly to an energy saving image-forming apparatus and a control method therefor which turns off power to circuits within the apparatus responsible for heavy power consumption when the image-forming apparatus is not used for a predetermined period of time.

The advent of the modern office has produced a marked increase in the use of equipment such as computers, facsimiles and duplicators. With many of these items, the amount of time the equipment is actually used is only twenty to thirty percent of total operating time. Accordingly, power consumed during periods of non-use (i.e. seventy to eighty percent of total operating time) is wasted unnecessarily. In an effort to promote environmentally safe products, the EPA (Environmental Protection Agency) has instituted a "green" designation for various types of equipment. For instance, when a computer with the "green" designation is not used for a predetermined period of time, the computer turns off power to components, such as the monitor, responsible for heavy power consumption. Accordingly, power is conserved while a user's exposure to potentially harmful electromagnetic waves is minimized. During this period of non-use, some components such as the ventilating fan are turned off, thereby reducing noise. Programs such as the "green" designation are adopted as part of EPA regulations.

Pursuant to the general industry trend of producing energy saving office equipment, several efforts have been made to make such equipment more and more power efficient. One effort is disclosed in U.S. Pat. No. 4,642,448 entitled Electrostatic Copying Apparatus issued to Shigemura et al. on 10 Feb. 1987. In this effort, an image forming apparatus is provided with an electrical heater having a heat controller for controlling energization and deenergization of the heater on the basis of detected temperature. The device also includes a manually operable power saving switch that produces a power saving signal to which the heat controller is partially responsive. Although that controller may produce some energy savings, I have found that a greater level of power efficiency can be obtained through the use of other techniques.

A more recent effort is disclosed in U.S. Pat. No. 5,241,349 entitled Image Forming Apparatus Having A Plurality Of Control Modes Of Thermal Fixing Apparatus issued to Nagasaka on 31 Aug. 1993. Here again, an image forming device is equipped with a section for controlling the temperature of a thermal fixing unit within the device. The device features three temperature control modes, each mode providing an additional level of energy savings. Although Nagasaka's effort reduces power being supplied to the thermal fixing unit in situations of reduced use, the embodiment described still provides no mechanism to reduce power to other portions of the device that are separately responsible for consuming large amounts of energy. Moreover, I have found that the energy efficiency of this device can be improved upon.

SUMMARY OF THE INVENTION

It is therefore an object of the present invention to provide an improved image forming apparatus and process.

It is another object to provide an image forming apparatus and an energy saving control method therefor that minimizes power consumption.

It is still another object to provide an energy saving, image forming apparatus and a control method therefor that implements primary and secondary modes of energy savings.

It is yet another object to provide an energy saving image forming apparatus and a control method therefor that maintains a minimum power level necessary for basic operation while in a secondary energy saving mode.

It is still yet another object to provide a device and process enabling incremental shedding of power consumption during varied operational conditions.

It is a still yet further object to provide a device and a process responding to a hiatus in usage by incrementally shedding consumption of power in a sequence of steps conforming to the division between a series of "warm-up" steps initiated in response to a request by a user for reactivation.

It is a further object to provide a device and process susceptible to both automatic and manual initiation of incremental shedding of power between instances of operational performance.

It is a still further object to provide a device and process accommodating incremental restoration of power to a plurality of operationally cooperating circuit stages in response to a single request by a user for reactivation of a printer.

It is a yet further object to provide a device and a process responding to hiatus in usage by incrementally shedding consumption of power and responding to a request by a user for reactivation by initiation of a sequence of "warm-up" steps beginning at a step conforming to the degree of incremental shedding accomplished.

To achieve these and other objects, an embodiment constructed according to the principles of the present invention controls an energy saving image-forming apparatus by establishing a primary energy saving mode when a user does not use the image-forming apparatus for a predetermined period of time, and establishes a secondary energy saving mode when a user inputs an energy saving signal.

The energy saving image-forming apparatus of the present invention provides a secondary energy saving key panel for generating the energy saving signal or a reactivation signal according to a user's key input. Power to a "primary energy saving circuit portion" is turned off during the primary energy saving mode. The "primary energy saving circuit portion" includes a heat lamp and a ventilating fan. Power to a "secondary energy saving circuit portion" and the "primary energy saving circuit portion" is turned off during the secondary energy saving mode. The "secondary energy saving circuit portion" includes components within the printer, such as an engine controller, an engine driver and an image processor. While in the secondary energy saving mode, input of the reactivation signal initiates a warm-up operation of those components within the "secondary energy saving circuit portion."

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 is a flow chart diagram illustrating particular features of a conventional energy saving control process;

DETAILED DESCRIPTION OF THE PREFERRED EMBODIMENT

Figure 1:
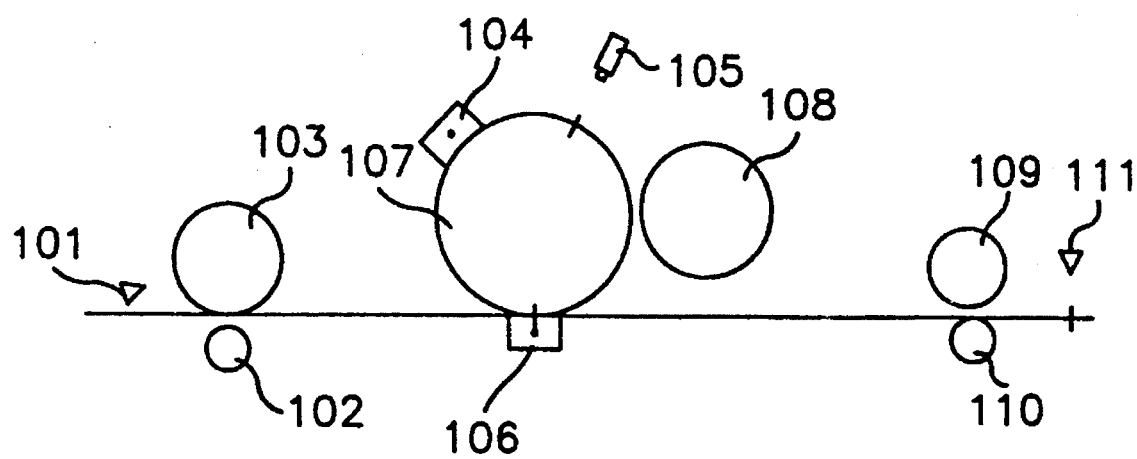
FIG. 1 is a diagram providing an abstract representation of the components of one typical image forming system suitable for explaining the principles of the instant invention.

Generally, an image forming system (e.g., a laser beam printer, a photocopier or a facsimile machine) such as, by way of example, the electrophotographic developing system abstractly represented in FIG. 1, has a plurality of moving and stationary electrically powered component parts collectively converting binary information (i.e., with the binary information typically received from an external source such as a modem or a personal computer coupled to the system) into images and recording those images upon record media such as, and again by way of example, cut sheets of paper, conveyed through the system. The exemplary system represented in FIG. 1 has a photosensitive drum 107 for forming an electrostatic latent image, a charging unit 104 for providing an uniform charge to photosensitive drum 107, an exposure unit 105 for selectively exposing the surface of photosensitive drum 107 to light in correspondence with the binary information and thereby generating the electrostatic latent image upon photosensitive drum 107, a developing unit 108 for developing the latent image formed as a consequence of the exposure of a transfer unit 106 for transferring a developer from photosensitive drum 107 to a record medium, a set of register rollers 109, 110 for feeding the medium, and fusing unit 103 for fusing the developer that has been transferred from photosensitive drum 107 to the medium. Location sensors 101, 111 detect the location of media conveyed through the system.

Figure 2:
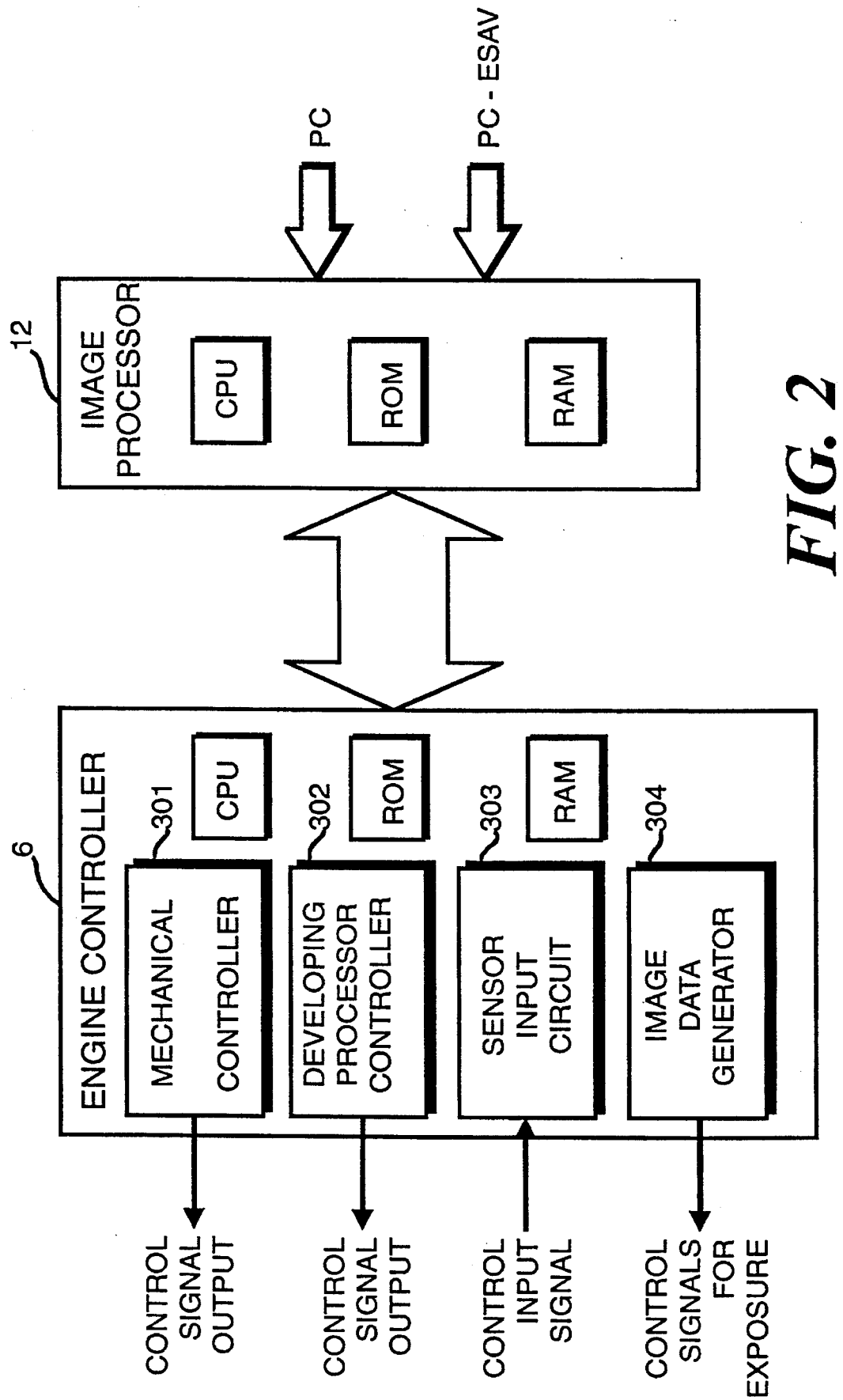
FIG. 2 is a simplified block diagram of a representative control system of an image forming system.

Referring now to FIG. 2, a schematic block diagram of the control circuit governing operational performance of a typical image-forming system uses a micro-processor based engine controller 6, having a central processing unit CPU, random access memory RAM and read only memory ROM, receives input signals from sensors such as location sensors 101, 111, and transmits and receives various control signals to and from portions of FIG. 1. A mechanical controller 301 produces signals for controlling motors and other moving mechanical components such as rotation of register rollers 109, 110 and rotation of photosensitive drum 107 and the rollers of fusing unit 103. Control signals for controlling charging unit 104, developing unit 108 and transfer unit 106 are generated by a developing processor controller 302. A sensor input circuit 303 receives the sensed values from various sensors within the system. An image data generator 304 generates signals to control exposure unit 105, thereby determining the substance of the images to be printed upon the record media. A micro-processor based image processor 12, having a central processing unit CPU, read only memory ROM (e.g., a font memory), and random access memory RAM, receives image data from the external source, such as a modem or personal computer. Image processor 12 processes image data to be printed in accordance with a program stored in its read only memory. The processed image data is then stored in its random access memory. An image processor, such as the one depicted in FIG. 2, is typically referred to as a video controller.

Many image forming systems have an energy saving function to reduce energy consumption by turning off power supplied to circuits within the device responsible for heavy power consumption during periods of non-use. These power hungry circuits control the operation of components within the device such as the heat lamp, ventilating fan, and other major power consuming components, that are notorious for heavy power consumption when the device is not being used. Power to these circuits is generally turned off in accordance with a programmed method performed by a controller within the device. An abstract representation of these features for a conventional energy saving technique is shown in FIG. 3 of the drawings.

Referring now to FIG. 3, in step 202, the printer makes a determination as to whether the power has been turned on. Once the power is turned on, the printer initiates a primary warm-up operation in step 204 by performing an internal set-up test and an initialization of the random access memory and the read only memory of the particular micro-processor based controller regulating the power saving operation. After the primary warm-up operation, a secondary warm-up operation is initiated in step 206. The secondary warm-up operation includes activating the heat lamp and ventilating fan. Next, in step 208, the printer determines when the printer is capable of performing a print operation. Once the printer is able to print, a print ready state is established in step 210. In the print ready state, the printer detects user inputs to determine whether the printer is in an operating state in step 212. So long as the printer is being used, the print ready state is maintained. If the printer is not in the operating state, a determination is made in step 214 of whether a predetermined period of time has elapsed without receiving any user instructions. That is, upon receiving a user's instruction, the controller of the printer begins a timing operation. If the predetermined period of time elapses without receiving any subsequent instructions, an energy saving mode is established in step 216. In the energy saving mode, the controller of the printer turns off (or reduces) power supplied to circuits within the printer responsible for heavy power consumption and noise production. These circuits typically control operation of the heat lamp installed within a heat roller for affixing developing material upon a printable medium, and the ventilating fan for cooling internal portions of the printer. The energy saving mode is maintained until a wake-up operation is initiated in step 218. The wake-up operation can be initiated by entering data through an image processing part of the printer or by a key input through optional energy saving mode selection keys of the printer. Once the wake-up operation is initiated, the printer immediately begins the secondary warm-up operation described above in step 206, and again repeats the steps thereafter.

There are many types of printers and other image forming office machines available on the market today. Such types include among others, dot matrix printers, laser beam printers, LED (Light Emitting Diode) printers. Generally, dot matrix printers consume less power than other types of printers. Accordingly, they usually do not include the energy saving mode described above. That is, with dot matrix printers, only steps 202 through 212 described above (i.e. portion (A) of FIG. 3) are programmed into the device as a means for saving power. Alternatively, all steps of FIG. 3 (i.e. portions (A) and (B)) are programmed into devices such as laser beam and LED printers. Accordingly, laser beam and LED printers generally include the energy saving mode. Even with the energy saving mode however, there is a great deal of unnecessary power consumption during the energy saving mode of currently available machines.

In the following description, specific details are set forth to provide a more thorough understanding of the present invention. It will be apparent, however, to one skilled in the art, that the present invention may be practiced without these specific details. In other instances well known circuits have not been described so as not to unduly obscure the present invention.

Figure 4:
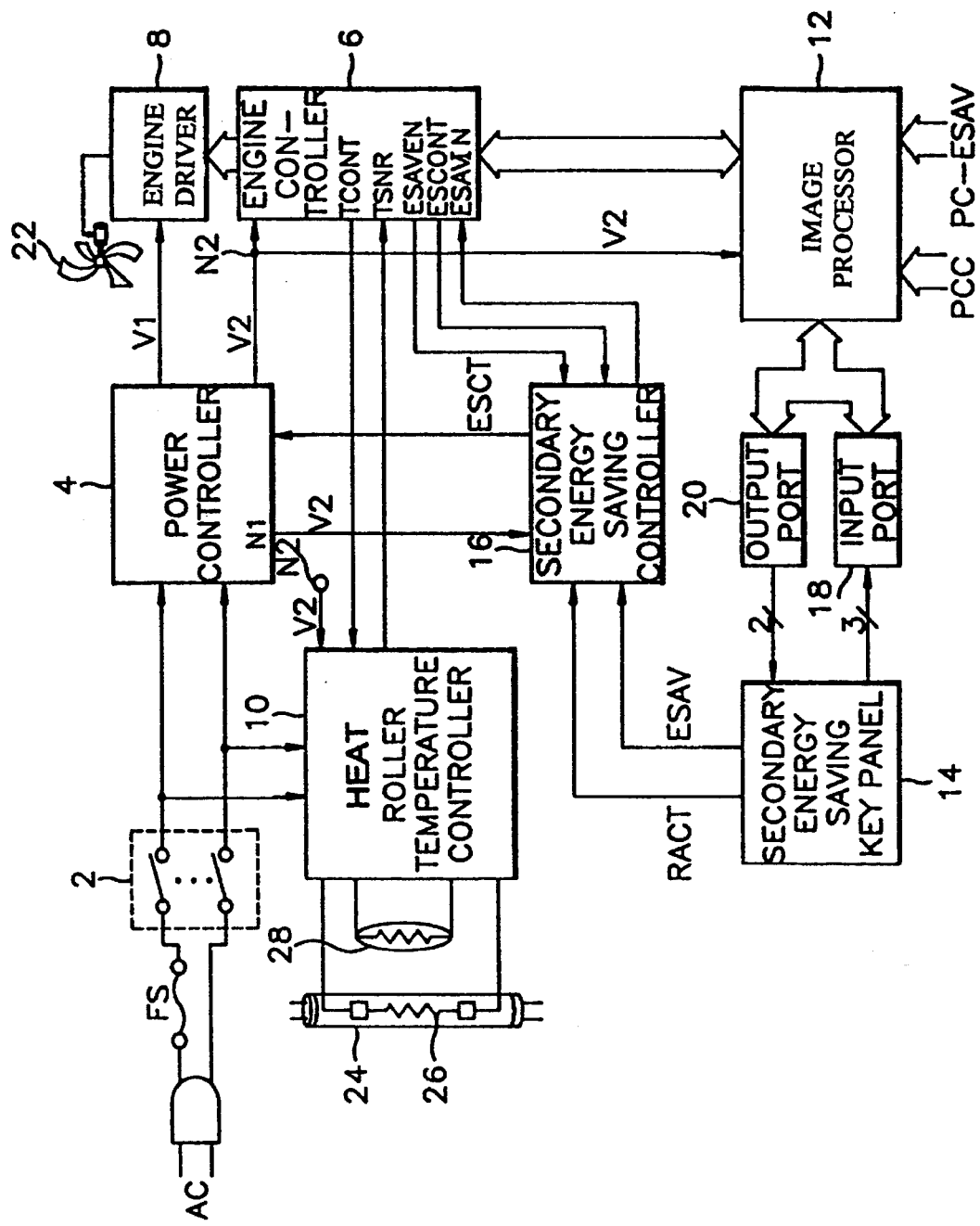
FIG. 4 is a partial single-line block diagram showing a power distribution and control circuit for saving energy in an image forming device constructed according to the principles of the present invention.

FIG. 4 is a block diagram showing a control circuit for saving energy in an image forming device constructed according to the principles of the present invention. In FIG. 4, a power switch 2 switches on/off alternating current (AC). A power controller 4 converts the alternating current (AC) into direct current (DC) and then supplies the direct current to respective parts of the printer. A secondary energy saving key panel 14 having a plurality of input keys serves as a device for executing a secondary energy saving mode. Secondary energy saving key panel 14 generates either an energy saving signal ESAV or a reactivation signal RACT when a user selectively inputs a corresponding mode key signal through manual selection of corresponding keys K1 . . . K6 (shown in FIG. 7). Secondary energy saving key panel 14 can alternatively be constructed by adding energy saving mode keys such as K1 . . . K6 for example, to a key panel that normally provides only general printer commands such as on-line, menu input or form feed. Such an embodiment can produce a cost reduction advantage by eliminating the need for specialized electrical control circuits.

A secondary energy saving controller 16 maintains its operation from a second voltage V2 received from power controller 4. Secondary energy saving controller 16 controls execution of the secondary energy saving mode in response to energy saving signal ESAV or reactivation signal RACT input from secondary energy saving key panel 14. Also, secondary energy saving controller 16 applies energy saving signal ESAVIN to engine controller 6. Secondary energy saving controller 16 may also establish the secondary energy saving mode in response to an energy saving control signal ESCONT supplied from engine controller 6. An input port 18 and an output port 20 are provided by image processor 12, to interface mode key signals between secondary energy saving key panel 14 and image processor 12. Image processor 12 is connected to a personal computer and receives inputs of coded data (PCC) corresponding to an image to be printed. The coded data is stored with a RAM (Random Access Memory) installed within image processor 12. Image processor 12 controls a character enlargement and contraction function, performs an emulation function, and processes image signals for conversion into image information to be printed on a medium such as a cut sheet of paper. Since image processor 12 does not consume an appreciable amount of power, it is included in a secondary energy saving circuit portion of the printer. Image processor 12 also interfaces an energy saving signal PC-ESAV transmitted by, for example, a personal computer to engine controller 6.

Engine controller 6 receives second voltage V2 from power controller 4. Engine controller 6 also receives printing and energy control signals from image processor 12 in order to control respective pans of the printer. An engine driver 8, which receives a first voltage V1 from power controller 4, drives a ventilating fan 22 through control of engine controller 6. Engine controller 6 and engine driver 8 are also included in the secondary energy saving circuit portion of the printer.

In one embodiment constructed according to the principles of the present invention, a primary energy saving circuit portion includes major energy consuming components of the system such as ventilating fan 22 and heat lamp 26. Heat lamp 26 receives alternating current (AC) from power switch 2 and proceeds to a primary energy saving mode under direction from engine controller 6. In the primary energy saving mode, power supplied to components of the primary energy saving circuit portion is automatically turned off pursuant to control of engine driver 8 and heat roller temperature controller 10 by engine controller 6.

A heat roller 24 is a device for applying heat and pressure upon a printable medium in order to affix developing material, such as toner, to a surface of the printable medium such as a sheet of paper. Heat lamp 26 is installed within heat roller 24 and produces the heat necessary for heat roller 24 to perform the above function. A temperature sensor 28 monitors the temperature of heat lamp 26. Ventilating fan 22 serves to remove heat from within the interior of the printer. A heat roller temperature controller 10, connected to power controller 4 to receive second voltage V2, outputs a signal TSNR corresponding to the current temperature detected by temperature sensor 28, to engine controller 6. Temperature controller 10 detects the off state of the printer, the stand-by state and the current temperature, via temperature sensor 28, and provides signal TSNR to enable engine controller 6 to determine the current state of the printer. Heat roller temperature controller 10, aside from being included in the secondary energy saving circuit portion, also controls the temperature of heat lamp 26 in accordance with a temperature control signal TCONT from engine controller 6. Power controller 4 converts alternating current (AC) into direct current and then supplies the direct current to respective parts of the circuit as voltage differences V1, V2.

Figure 5:
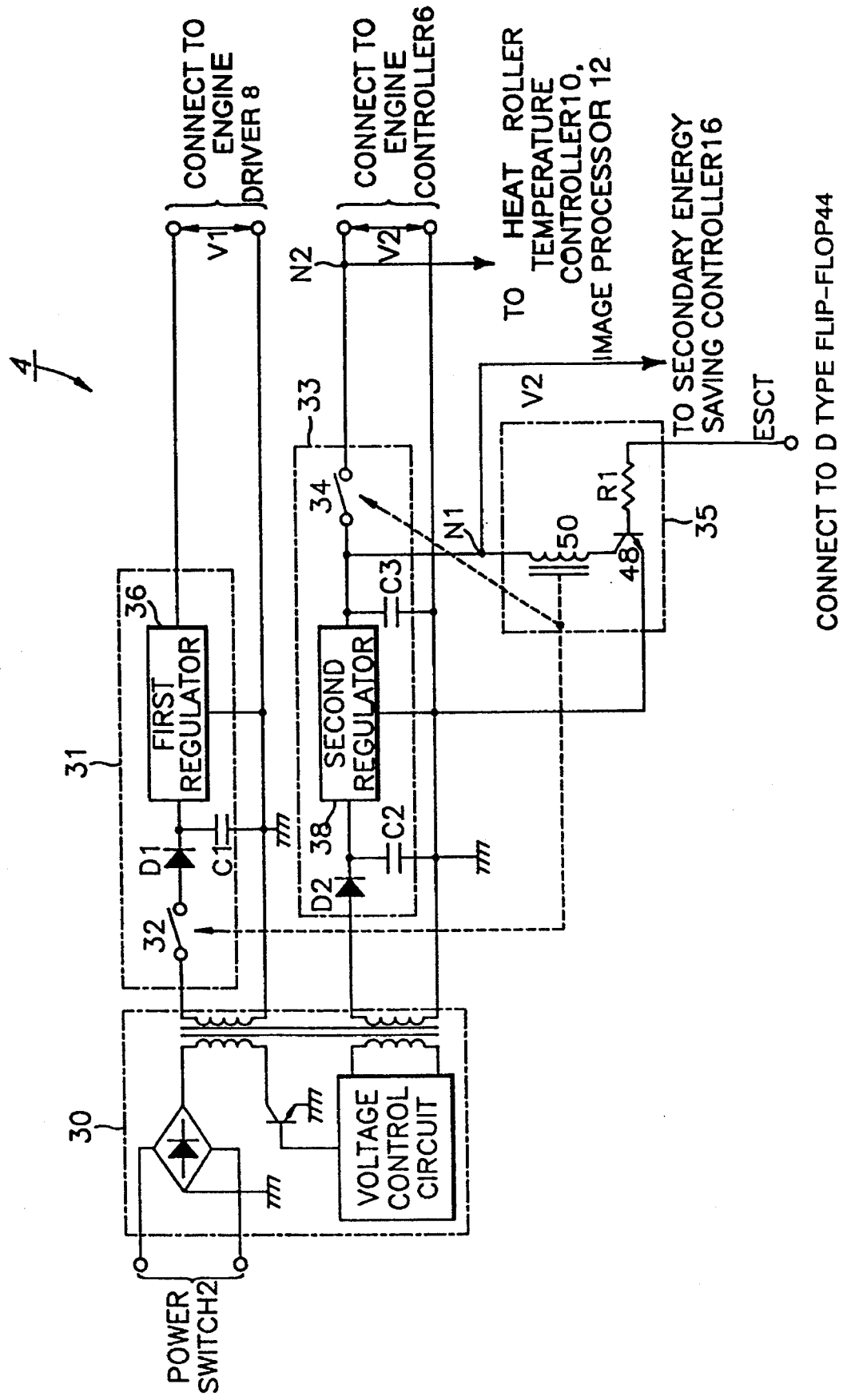
FIG. 5 is a detailed circuit diagram of the power controller shown in FIG. 4.

FIG. 5 shows a detailed circuit diagram of power controller 4. Power controller 4 uses a rectifying circuit 30, a first switching portion 31, a second switching portion 33 and a switching controller 35. Since power controller 4 is included in the secondary energy saving circuit portion of the printer, its power is turned off during the secondary energy saving mode.

Referring again to FIG. 5, rectifying circuit 30 rectifies alternating current (AC) applied through power switch 2, and then converts the alternating current (AC) into a first direct current exhibiting a voltage difference V1 and a second direct current exhibiting a voltage difference V2. Rectifying circuit 30 is composed of a rectifying portion for rectifying an input and a voltage control circuit for controlling the voltage. First switching portion 31 includes a first switch 32 switching the first direct current, interposed between rectifying circuit 30 and a diode D1 coupled to a first regulator 36 regulating the first direct current through first switch 32 and applying first voltage V1 to engine driver 8. Second switching portion 33 includes a second regulator 38 for regulating the second direct current and applying second voltage V2 to engine controller 6. Second switching portion 33 also includes a second switch 34 interposed between second regulator 38 and engine controller 6 to interrupt second voltage V2. Switching controller 35, which controls the switching of first switching portion 31 and second switching portion 33, includes a transistor 48 that operates according to a secondary energy saving signal from secondary energy saving controller 16. The secondary energy saving signal is received by transistor 48 through a resistor R1. Switching controller 35 also includes a relay solenoid 50, one side of which is connected between second regulator 38 and second switch 34 and another side of which is connected to transistor 48. Relay solenoid 50 controls the switching operation of first switch 32 and second switch 34 to an on, or electrically closed state when transistor 48 is driven into a low impedance, electrically conductive state by application of a logic "high" state energy saving control signal ESCT from secondary energy saving controller 16, as is explained in the following paragraphs.

First switch 32 of power controller 4 is connected to first regulator 36 via a first diode D1. When first switch 32 is switched on, the first voltage V1 of, for example, twenty-four volts, is output from first regulator 36 and supplied to engine driver 8. Second switch 34 of power controller 4 is connected between an output terminal of second regulator 38 and engine controller 6. When second switch 34 is switched on, the second voltage V2 of, for example, five volts, is output from second regulator 38 and supplied to engine controller 6. The switching operation of first and second switches 32 and 34 is controlled by the response of switching controller 35 to a secondary energy saving control signal ESCT. Secondary energy saving control signal ESCT is supplied to switching controller 35 from secondary energy saving controller 16. First and second switches 32 and 34 are activated and controlled together. Based upon their switching operations, power to the components of the printer grouped with the secondary circuit, namely engine controller 6, engine driver 8 and image processor 12 is either supplied or (e.g., driving the secondary energy saving mode for example) turned off. These switching operations control energy savings within the printer.

An output terminal of second regulator 38 and relay 50 are connected together while a first node N1 that connects to secondary energy saving controller 16 is formed between the output terminal of second regulator 38 and relay 50. Second voltage V2 from second regulator 38 is continually applied to first node N1. Therefore, switching controller 35 and secondary energy saving controller 16 always receive second voltage V2. A second node N2 that connects to engine controller 6, to heat roller temperature controller 10 and to image processor 12 is placed between second switch 34 and engine controller 6. Second voltage V2 from the second regulator 38 is applied to second "node N2" according to the switching operation of second switch 34. Accordingly, when second switch 34 is switched to a closed state to complete the electrical current between second regulator 38 and second node N2, engine controller 6, heat roller temperature controller 10 and image processor 12 receive second voltage V2. When second switch 34 is switched to an open state, namely during the secondary energy saving mode, engine controller 6 and image processor 12 do not receive second voltage V2.

One end of relay solenoid 50 is connected to first node N1 while the other end is connected to a collector of transistor 48. Switching controller 35 receives secondary energy saving control signal ESCT from secondary energy saving controller 16, through resistor R1, at the base, or control electrode of transistor 48, thereby enabling the operational state of transistor 48 to simultaneously control first switch 32 and second switch 34. Transistor 48 preferably is an NPN type of bipolar transistor. A base electrode of transistor 48 is connected to resistor R1 and an emitter electrode is connected to a reference potential such as a local ground potential.

Figure 6:
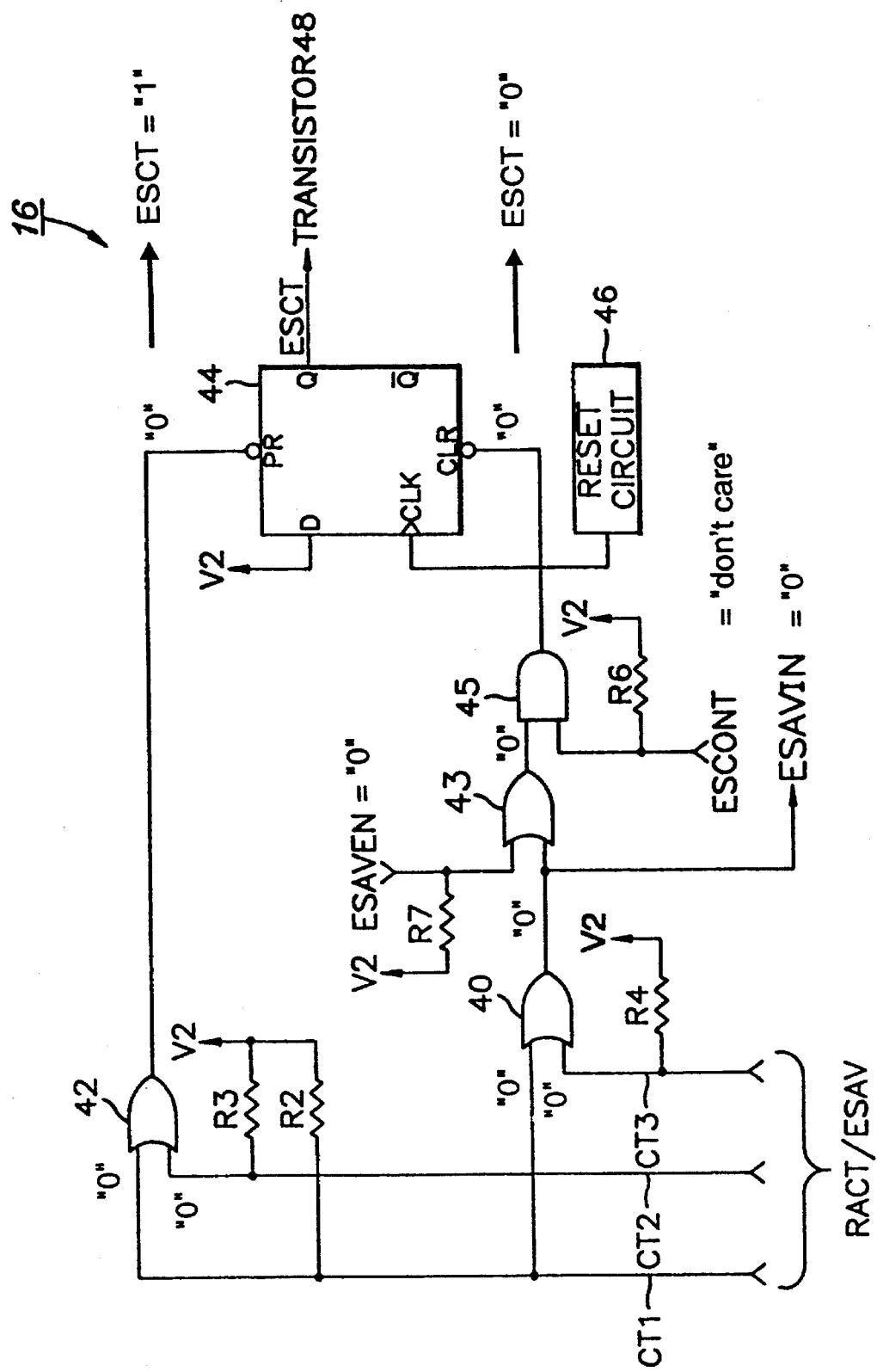
FIG. 6 shows a detailed circuit diagram of the secondary energy saving controller shown in FIG. 4.

FIG. 6 shows a detailed circuit diagram of secondary energy saving controller 16. Secondary energy saving controller 16 first, second and third OR gates 40, 42 and 43, respectively, an AND gate 45, a D type flip-flop 44 and a reset circuit 46. First OR gate 40 operates in response to reception on one input port of energy saving signal ESAV from secondary energy saving key panel 14 shown in FIG. 2. Second OR gate 42 operates in response to reception on one input port of reactivation signal RACT, also generated by secondary energy saving key panel 14. An output terminal of first OR gate 40 is connected to an input port of third OR gate 43 and also to an energy saving input terminal ESAVIN of engine controller 6. In one embodiment, a signal input to engine controller 6 through energy saving input terminal ESAVIN informs engine controller 6 of a key input corresponding to the secondary energy saving mode. In a different embodiment, the signal from key panel 14 can be applied to controller 6 via input port 18 and image processor 12. Third OR gate 43 logically responds to the output of first OR gate 40 resulting from an energy saving signal ESAV from key panel 14 or PC-ESAV via image processor 12 via input port 18, or an energy saving enable signal from the ESAVEN terminal of engine controller 6, and applies a logical output signal to a first input port of AND gate 45. One input port of third OR gate 43 may receive the output of first OR gate 40 or a second input port of OR gate 43 may receive an energy saving mode selection signal ESAVEN from the ESAVEN output terminal of controller 6 in response to generation of a secondary energy mode selection signal PC-ESAV applied to image processing port 12 by a computer coupled to the printer. D-type flip-flop 44 is a circuit generating a secondary energy saving control signal ESCT exhibiting a logically "low" level applied to the base electrode of transistor 48 of power controller 4 in order to render transistor 48 non-conductive, open switches 32 and 34, and to thereby establish the secondary energy saving mode. Secondary energy saving control signal ESCT is output from the "Q" port of D type flip-flop 44 in a logic "low" level when, in response to application by key panel 14 of secondary energy saving signal ESAV to one input port of first OR gate 40 and application of energy control signal ESCONT from controller 6 to a second input port of AND gate 45, AND gate 45 applies a reset signal from the output port of AND gate 45 to the reset terminal CLR of D type flip-flop 44. Secondary energy saving control signal ESCT becomes a logic "high" level when reactivation signal RACT from second OR gate 42 is applied to D type flip-flop 44. D type flip-flop 44 additionally has reset circuit 46 for initiating operation of secondary energy saving controller 16, if necessary. It is preferable that reset circuit 46 be connected to a clock terminal CLK of D type flip-flop 44.

Figure 7:
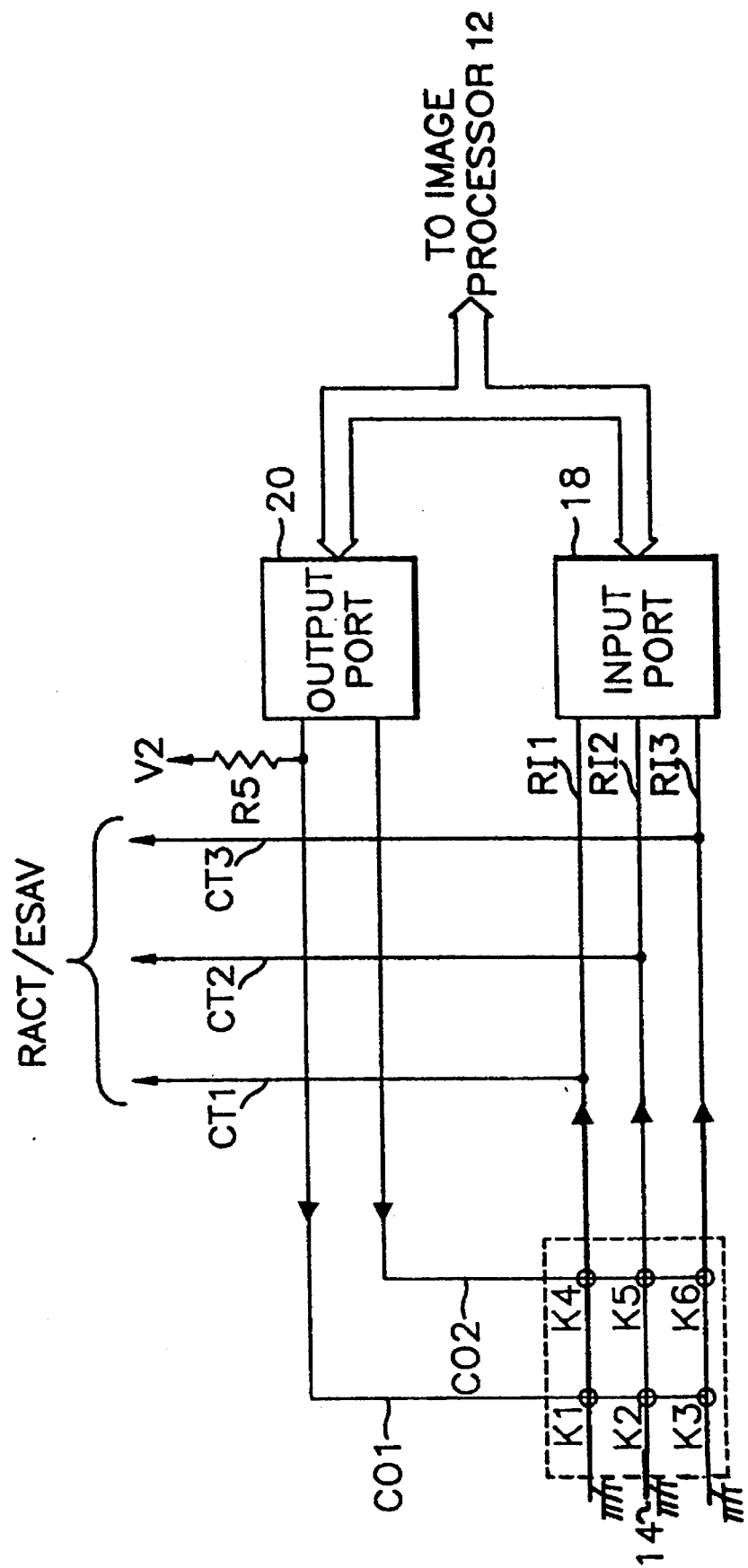
FIG. 7 shows connections between the secondary energy saving controller, the secondary energy saving key panel and the input/output ports shown in FIG. 4.

The following is a more detailed description of the connections within secondary energy saving controller 16 shown in FIG. 6, in conjunction with the detailed view of key panel 14 shown in FIG. 7. Signals from a first control line CT1 and a third control line CT3 are transmitted to secondary energy saving controller 16 from secondary energy saving key panel 14 in response to manual activation of corresponding keys K1, K2, K3 or K6, as is explained in the following paragraphs. First control line CT1 is connected to first input ports of first OR gate 40 and second OR gate 42, while third control line CT3 is connected to a second input port of first OR gate 40. First OR gate 40 receives second voltage V2 from second regulator 38 through a pull-up resistor R4 connected to third control line CT3. An output line of first OR gate 40 is connected to an energy saving input terminal ESAVIN of engine controller 6 and to a first input port of third OR gate 43. A second input port of third OR gate 43 is connected to an output terminal of engine controller 6 to receive energy saving enable signal ESAVEN. The second input port of third OR gate 43 also receives second voltage V2 from node N1 via a pull-up resistor R7.

A first input port of AND gate 45 is connected to the output line of third OR gate 43 while a second input port of AND gate 45 receives energy control signal ESCONT from engine controller 6 and second voltage V2 through a pull-up resistor R6. An output line of AND gate 45 is connected to a reset terminal CLR on D type flip-flop 44. First control line CT1 and a second control line CT2, which extend from secondary energy saving key panel 14 shown in FIG. 6, are respectively connected to first and second input ports of second OR gate 42. An output line from second OR gate 42 is connected to a preset terminal PR on D type flip-flop 44. The second input port of second OR gate 42 also receives second voltage V2 from second regulator 38 through pull-up resistor R3, from node N1. Pull-up resistors R2 and R3 are respectively connected to first and second control lines CT1 and CT2. Second voltage V2, transmitted from a first node N1 of power controller 4, is continually applied to first, second and third control lines CT1, CT2 and CT3 through pull-up resistors R2, R3 and R4, respectively. Second voltage V2 applied to secondary energy saving controller 16 is the minimum amount of power required to switch from the secondary energy saving mode to a reactivation mode.

FIG. 7 shows connections between secondary energy saving controller 16, secondary energy saving key panel 14 and input and output ports 18 and 20 respectively. Secondary energy saving key panel 14, having a key matrix of manually operable keys K1 . . . K6, for receiving user inputs, provides signals to secondary energy saving controller 16 to initiate the secondary energy saving mode. Typically, input lines RI1, RI2, and RI3 are connected to a reference potential such as a local ground, as is shown in FIG. 7. Output signals from secondary energy saving key panel include reactivation signal RACT and energy saving signal ESAV. Reactivation signal RACT is generated when the user simultaneously presses keys K1 and K2 on secondary energy saving key panel 14. Energy saving signal ESAV is generated when the user simultaneously presses keys K1 and K3. Secondary energy saving key panel 14 is connected to image processor 12 via input and output ports, 18 and 20 respectively. A first row input line RI1, a second row input line RI2 and a third row input line RI3 extend between secondary energy saving key panel 14 and input port 18. A first column output line CO1 and a second column output line CO2 extend between key panel 14 and output port 20. A pull-up resistor R5 connected between first column output line CO1 and output port 20 continually receives second voltage V2 from second regulator 38 via node N1. Simultaneous manipulation of keys K1 and K2 initiates the reactivation mode through generation of control signal ESCT exhibiting a logically "high" level to energize relay solenoid 50, close switches 32, 34, restore voltage V1 and, at node N2, voltage V2.

Figure 8:
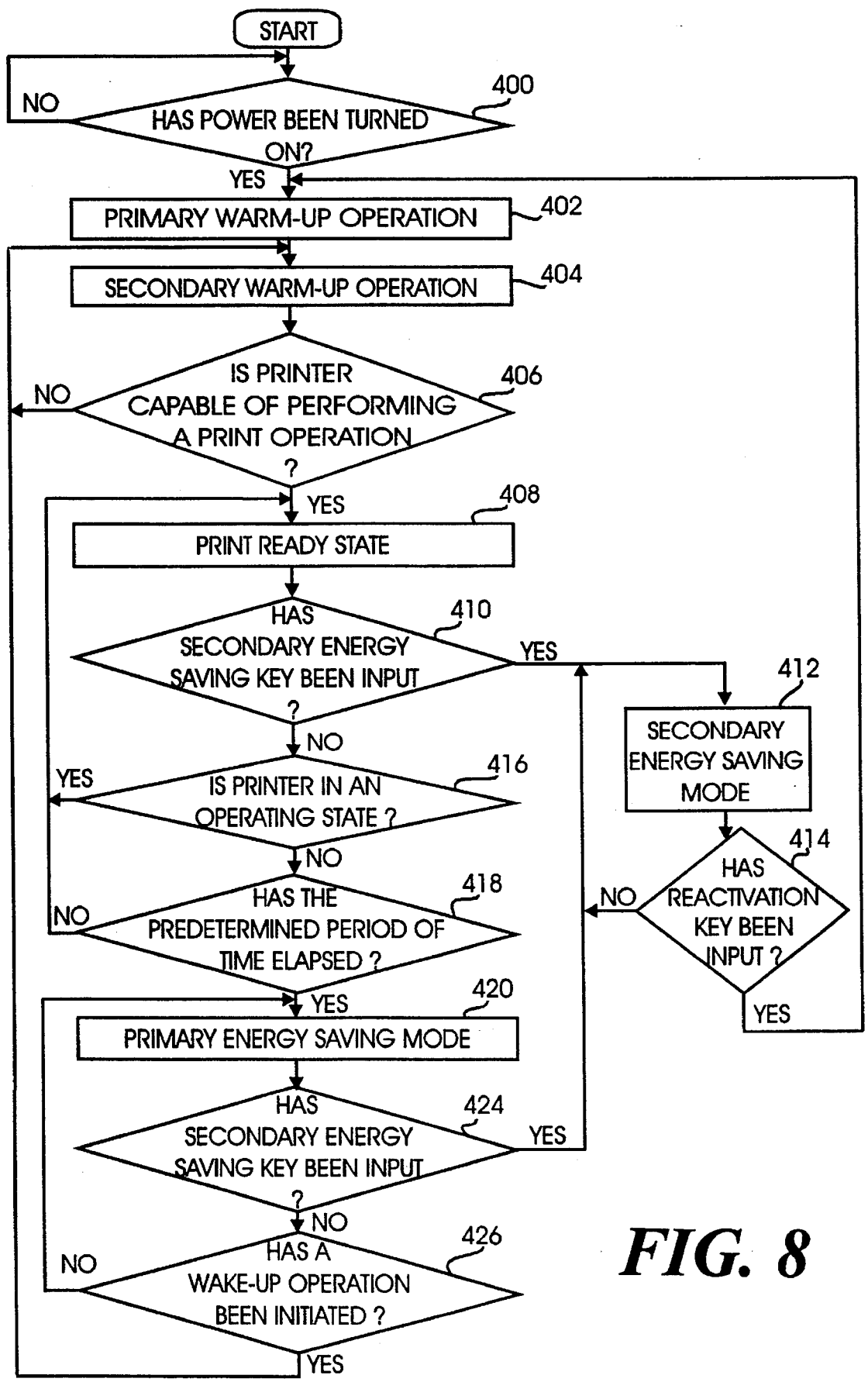
FIG. 8 is a flow diagram showing an energy saving control process performed according to the principles of the present invention.
Figure 9:
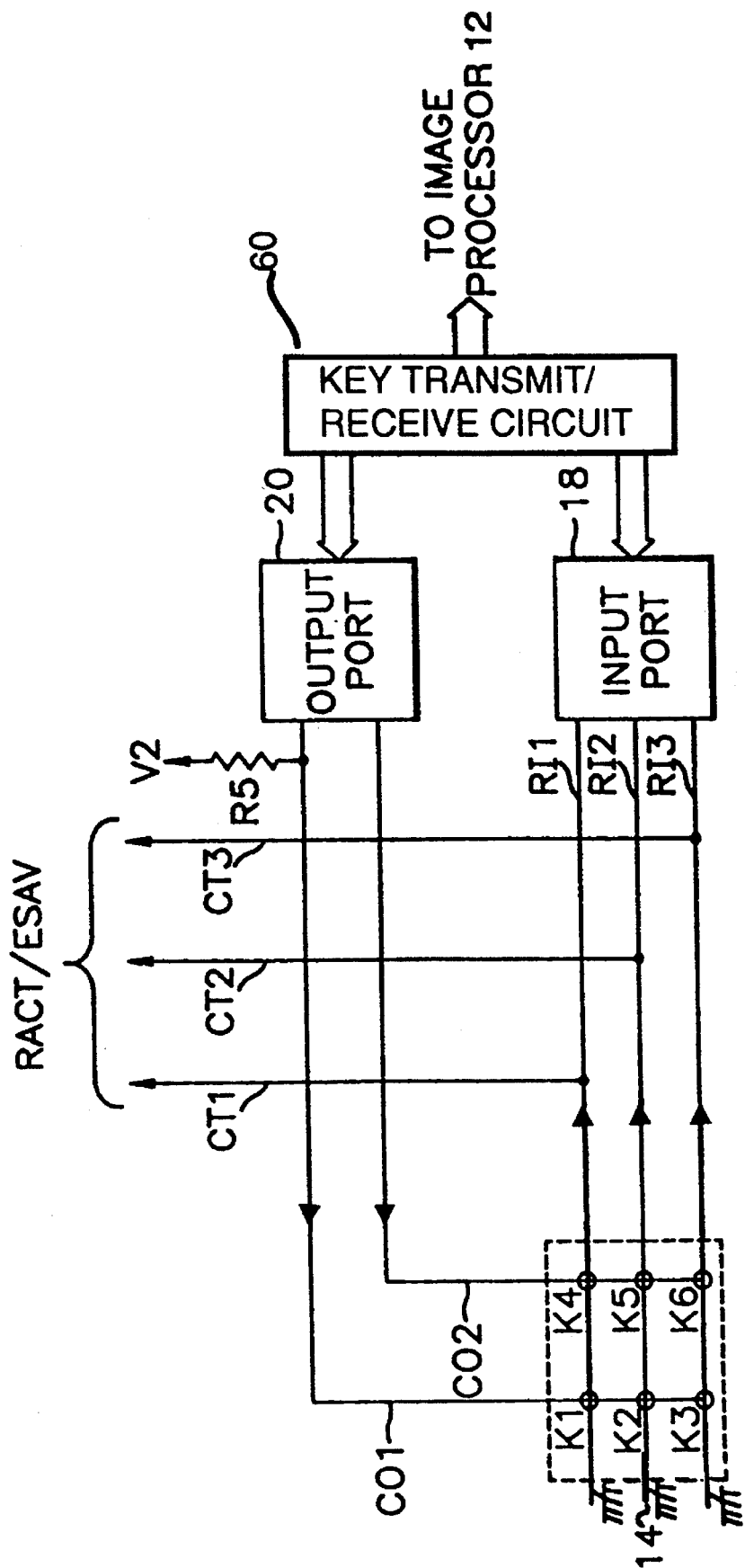
FIG. 9 is a detailed circuit diagram of an alternative implementation of the circuit illustrated in FIG. 7.

Referring now to FIG. 8, the energy saving control operations according to the circuit construction of the present invention are now described as follows. When a user of the printer switches power switch 2 on (i.e., to a closed circuit state), engine controller 6 perceives the on-state via the presence of an electrical signal from controller 10 applied to the TSNR terminal of controller 6, and initiates a primary warm-up operation (step 402) by performing an internal set-up test and an initialization of a RAM (Random Access Memory) and a ROM (Read Only Memory). Engine driver 8, heat roller temperature controller 10, image processor 12 and all other components within the secondary energy saving circuit portion are also warmed-up during the primary warm-up operation 402. Next, heat lamp 26 and ventilating fan 22 (i.e. the primary energy saving circuit portion) are warmed-up in a secondary warm-up operation 404. Such operations are performed from step 400 through step 404.

Once the printer is determined to be capable of performing a print operation (Step 406) a print ready state is established in step 408. After the print ready state has been established, a first determination is made in step 410 as to whether a secondary energy saving key has been input. If the secondary energy saving key has not been input, engine controller 6 determines whether the printer is performing a printing operation (i.e., whether the printer is operating?) in step 416 and whether a predetermined period of time (usually, three minutes with a laser beam printer) has elapsed without any user inputs, in step 418. That is, when the conditional determination of step 416 is answered in the negative after completion of the operation requested by the last user input, the controller of the printer begins a timing operation. If the predetemined period of time elapses without any subsequent user input, a primary energy saving mode is established in step 420. In the primary energy saving mode, engine controller 6 either turns off (or reduces) power supplied to the primary energy saving circuit portion (i.e. heat lamp 26 and ventilating fan 22). During the primary energy saving mode, the laser beam or LED printer requires only about thirty watts. Next, in step 424, a second determination is made of whether the secondary energy saving key has been input. If the secondary energy saving key has not been input, a determination is made in step 426 of whether a wake-up operation has been initiated. The wake-up operation can be initiated by either entering data from a personal computer through image processor 12 or by a key input through option keys K1 . . . K6 of the secondary energy saving key panel 14 of the printer. Once the wake-up operation is initiated, engine controller 6 immediately begins the secondary warm-up operation described above in step 404, and again repeats the steps thereafter.

If in steps 410 and 424 above, it is determined that the secondary energy saving key has been input, engine controller 6 establishes the secondary energy saving mode. The secondary energy saving mode is selected when the user enters designated keys on secondary energy saving key panel 14 or on the personal computer keyboard coupled to the printer via image processing port 12. During the secondary energy saving mode, power to the primary and secondary energy saving circuits remains off.

The power control operation described above will now be described in detail with reference to FIGS. 4, 5, 6, and 7. When a user simultaneously presses keys K1 and K3 on secondary energy saving key panel 14, logic "low" signals are input to first OR gate 40 via first and third control lines, CT1 and CT3, to activate the secondary energy saving mode by generating energy saving signal ESAV. The output generated by first OR gate 40 is applied to the ESAVIN terminal of controller 6, and if controller 6 finds that the operational conditions (e.g., the condition of step 416 is negative), control signal ESCONT, in a logic "high" state, is applied to the one input port of AND gate 45. Alternatively, signals on line CO1 in response to manipulation of keys K1, K3, provide a corresponding input to image processor 12 and controller 6 via input port 18. The output from first OR gate 40 is then applied to reset terminal CLR of D type flip-flop 44 after being logically operated upon by third OR gate 43 and AND gate 45. The binary state of the signal applied to reset terminal CLR is essentially determined by third OR gate 43 and AND gate 45. If either energy saving control signal ESCONT supplied to one input terminal of AND gate 45 from engine controller 6 or an output signal from third OR gate 43 is in a logic "low" state, the logic "low" state is applied to reset terminal CLR of D type flip-flop 44. Alternatively, if both energy saving control signal ESCONT and the output signal from third OR gate 43 are in a logic "high" state, the logic "high" state is applied to reset terminal CLR. Energy saving control signal ESCONT may be generated in engine controller 6 in response to an energy saving signal PC-ESAV output from the personal computer or, alternatively, reception of a reactivation signal from key panel 14 via output port 20. Energy saving signal PC-ESAV is transmitted to engine controller 6 through image processor 12. Since the signal output from first OR gate 40 is applied to engine controller 6 via energy saving input terminal ESAVIN, engine controller 6 is able to confirm that energy saving signal ESAV has been output from secondary energy saving key panel 14. D type flip-flop 44 outputs a logic "low" signal in response to a logic "low" signal applied to reset terminal CLR. Accordingly, the logic "low" signal from D type flip-flop 44 is applied to a base terminal of transistor 48 through resistor R1. The signal output from D type flip-flop 44 is secondary energy saving control signal ESCT. Transistor 48 turns off (i.e., interrupts electrical conduction through the solenoid coil of relay 50) in response to the logic "low" signal output from D type flip-flop 44, thereby triggering relay 50 to switch first and second switches, 32 and 34, to an off (i.e., electrically open circuit) state. Accordingly, first and second voltages, V1 and V2, previously applied to engine controller 6 in node N2, engine driver 8, heat roller temperature controller 10 and image processor 12 via node N2 from power controller 4, are turned off.

Meanwhile, secondary energy saving controller 16 remains in an operating state by virtue of second voltage V2 being supplied from first node N1 of power controller 4. At this time, power being applied responds only to secondary saving key panel 14. Rectifying circuit 30, second regulator 38, secondary energy saving controller 16 and pull-up resistor R5 are connected to first column output line CO1 of output port 20. Thus, when rectifying circuit 30 is used as a linear circuit, and the other circuits utilize a power efficient device such as a CMOS, it is possible to maintain printer operation in the secondary energy saving mode with only two to three watts of power being consumed. In addition, the secondary energy saving mode is able to be activated without utilizing first and second OR gates 40 and 43 of FIG. 6. That is, in response to energy saving signal ESAV generated from secondary energy saving key panel 14 and applied to engine controller 6 through input port 18 and image processor 12, energy saving control signal ESCONT indicative of the secondary energy saving mode is supplied to AND gate 45 of secondary energy saving controller 16. Accordingly, the secondary energy saving mode depicted in step 412 may be activated and maintained.

| | | | | | Summary of Secondary Energy Saving Mode (i.e. K1 and K3 depressed) | | | | | |
|---|---|---|---|---|---|---|---|---|---|---|
| CT1 | CT3 | OR gate 40 | ESAVEN | OR gate 43 | ESCONT | AND gate 45 | D type flip-flop | transistor 48 | 1st SW 32 | 2nd SW 34 |
| 0 | 0 | 0 | 0 | 0 | DON'T CARE | 0 | 0 | OFF | OFF | OFF |

While the primer maintains the secondary energy saving mode in step 412, if reactivation signal RACT is input in step 414, engine controller 6 proceeds back to step 402 and performs the primary warm-up operation. To input reactivation signal RACT, the user simultaneously presses keys K1 and K2 on secondary energy saving key panel 14. This causes logic "low" signals to be input to second OR gate 42 through first and second control lines CT1 and CT2. Second OR gate 42, response to the logic "low" signals, outputs a logic "low" signal to preset terminal PR of D type flip-flop 44. Accordingly, D type flip-flop 44 outputs a logic "high" signal to the base of transistor 48 through resistor R1. The signal applied to transistor 48 from D type flip-flop 44 is secondary energy saving control signal ESCT. Transistor 48 turns on in response to the logic "high" signal output from D type flip-flop 44. When transistor 48 turns on, relay solenoid 50 switches first and second switches 32 and 34 to an on, or electrically closed circuit state. Accordingly, engine controller 6, engine driver 8, heat roller temperature controller 10 and image processor 12 receive voltages V1 and V2 from power controller 4. After performing the primary warm-up operation in step 402, the secondary warm-up operation is performed in step 404 and the steps thereafter are repeated.

| Summary of Reactive Procedure (i.e. K1 and K2 depressed) | | | | | | |
|---|---|---|---|---|---|---|
| CT1 | CT2 | OR gate 42 | D type flip-flop | transistor 48 | 1st SW 32 | 2nd SW 34 |
| 0 | 0 | 0 | 1 | ON | ON | ON |

While a relay is used in the present invention to perform the switching on/off operation, it will be apparent to one skilled in the art, that various kinds of transformed switching elements may be used in performing the control operation of switching electrical power on and off for saving the energy by several kinds of input signals such as an electric signal, temperature, and light. Also, while the secondary energy saving key panel 14 is used for the control of secondary energy saving in the foregoing embodiment, a key for initiating the secondary energy saving may programmed alternatively into the personal computer albeit at a loss of local control of the printer if key panel 14 is removed; this enables the user to transmit a secondary energy saving signal PC-ESAV with this key. Image processor 12 applies the control signal corresponded to the secondary energy saving signal PC-ESAV to the engine controller 6 so that the secondary energy saving may be performed.

Furthermore, key panel 14 may alternatively be constructed with option keys controlling different selected aspects of the printing operation. If key panel 14 is constructed to provide such option keys, a key transmits and receives circuit 60 coupled between image processor 12 and key panel 14; output port 20 and input port 18 would be constructed as part of the key transmit-receive circuit 60. The different key combinations provided by manual activation of the keys K1 ... K6 of key panel 14 would be read by input port 18 into key transmit-receive circuit 60 which, in turn, would provide corresponding signal to image processor 12; scanned data received by image processor 12 (as, for example, from a personal computer) would be read by key transmit-receive circuit 60 and applied to the key panel 14 by output port 20.

As described in the foregoing paragraphs of this detailed description, the present invention advantageously provides an image forming apparatus with a primary energy saving mode and a secondary energy saving mode in order to effectively reduce energy waste. While there have been illustrated and described what are at present considered to be preferred embodiments of the present invention, it will be understood by those skilled in the art that various changes and modifications may be made, and equivalents may be substituted for elements thereof without departing from the true scope of the present invention. Therefore, it is intended that the present invention not be limited to the particular embodiment disclosed as the best mode contemplated for carrying out the present invention, but that the present invention include all embodiments falling within the scope of the appended claims.

What is claimed is:

1. A method for controlling an energy saving image-forming apparatus having a primary energy saving circuit portion, a secondary energy saving circuit portion and secondary energy saving key means for generating one of an energy saving signal and a reactivation signal in response to a user's key input, said method comprising the steps of:

initiating a primary energy saving mode by turning off power to said primary energy saving circuit portion in response to said image forming apparatus failing to receive an input within a predetermined period of time;

initiating a secondary energy saving mode during said primary energy saving mode by turning off power to said secondary energy saving circuit portion in response to generation of said energy saving signal; and performing a warm-up operation during said secondary energy saving mode by supplying power to said secondary energy saving circuit portion in response to generation of said reactivation signal.

2. The method of claim 1, wherein said primary energy saving circuit portion comprises a heat lamp and a ventilating fan.

3. The method of claim 2, wherein said secondary energy saving circuit portion comprises:

an engine driving part for driving a plurality of components within said image forming apparatus;

an engine controller for controlling said image forming apparatus;

an image processing part for processing image data to be printed; and a pressing roller temperature controller for controlling a temperature of said heat lamp.

4. An energy saving image forming apparatus, comprising:

a primary energy saving circuit portion that is turned off in response to said image forming apparatus failing to receive an input within a predetermined period of time;

a secondary energy saving circuit portion that is turned off in response to a user's input of an energy saving signal and turned on in response to the user's input of a reactivation signal, said secondary energy saving circuit portion consuming less energy than said primary energy saving circuit portion;

secondary energy saving key input means for enabling the user's input of said energy saving signal and said reactivation signal; and energy saving control means for turning off power applied to said secondary energy saving circuit portion in response to said energy saving signal and supplying power to said secondary energy saving circuit portion in response to said reactivation signal.

5. The energy saving image forming apparatus of claim 4, wherein said primary energy saving circuit portion comprises a heat lamp and a ventilating fan.

6. The energy saving image forming apparatus of claim 5, wherein said secondary energy saving circuit portion comprises:

an engine driving part for driving a plurality of components within said image forming apparatus;

an engine controller for controlling the image forming apparatus;

an image processing part for processing image data to be printed; and a heat roller temperature controller for controlling a temperature of said heat lamp.

7. The energy saving image forming apparatus of claim 4, wherein said secondary energy saving key input means comprise a key panel having a plurality of keys, said energy saving signal being input by pressing a first predetermined sequence of said plurality of keys on said key panel, said reactivation signal being input by pressing a second predetermined sequence of said plurality of keys on said key panel.

8. The energy saving image forming apparatus of claim 7, wherein said key panel is a keyboard from a computer connected to the energy saving image-forming apparatus.

9. The energy saving image forming apparatus of claim 7, wherein said key panel is a secondary energy saving key panel connected to the energy saving image-forming apparatus for receiving input of said energy saving signal and said reactivation signal.

10. The energy saving image forming apparatus of claim 7, wherein said energy saving control means comprise:
  switching means for enabling power transfer from a power source to said secondary energy saving circuit portion when in an on state, said switching means disabling power transfer from said power source to said secondary energy saving circuit portion when in an off state; and
  switching signal generation means for generating a power turn off signal for switching said switching means to said off state in response to said energy saving signal, and for generating a power turn on signal for switching said switching means to said on state in response to said reactivation signal.

11. The energy saving image-forming apparatus of claim 10, wherein said switching signal generation means comprise:
  a plurality of logic gates for logically combining electrical signals in response to input of one of said energy saving signal and said reactivation signal; and
  means for outputting said power turn on signal and said power turn off signal to said switching means in dependence upon binary logic values output from said plurality of logic gates.

12. The energy saving image-forming apparatus of claim 11, wherein said plurality of logic gates and said output means further comprise:
  a first OR gate for logically combining said energy saving signal and a first input signal;
  a second OR gate for logically combining said reactivation signal and said first input signal;
  a third OR gate for logically combining an output signal from said first OR gate and an energy saving enable signal provided from an engine controller of said energy saving image-forming apparatus; and
  a flip-flop for outputting one of said power turn on signal and said power turn off signal in dependence upon an output signal from said second OR gate and an output signal from said third OR gate.

13. An energy saving image forming apparatus for performing an image printing operation, comprising:
  rectifying means for rectifying an alternating electrical current and converting the alternating electrical current into a direct electrical current;
  an energy saving circuit portion for performing said image printing operation, said energy saving circuit portion receiving said direct electrical current at first and second electrical potentials;
  energy saving key input means having a plurality of keys, for outputting an energy saving signal in response to a user's key input;
  latch means for outputting an energy saving control signal to synchronize the image-forming apparatus;
  first switching means connected between said rectifying means and said energy saving circuit portion, for enabling transmission of said direct electrical current at said first electrical potential from said rectifying means to said energy saving circuit portion;
  second switching means connected between said rectifying means and said energy saving circuit portion, for enabling transmission of said direct electrical current at said second electrical potential from said rectifying means to said energy saving circuit portion; and
  switching control means for controlling switching of said first and second switching means in response to said energy saving control signal from said latch means.

14. A method for controlling an energy saving image-forming apparatus, comprising the steps of:
  establishing a primary energy saving mode in response to non-use of said image-forming apparatus for a predetermined period of time; and
  establishing a secondary energy saving mode after establishing said primary energy saving mode, said secondary energy saving mode being established in response to a user input of an energy saving signal, said image forming apparatus saving more energy during said secondary energy saving mode than during said primary energy saving mode.

15. An energy saving image forming apparatus, comprising:
  a primary energy saving circuit portion turned electrically off in response to activation of a primary energy saving mode, said primary energy saving mode being activated when said image forming apparatus fails to receive within a predetermined period of time an input instruction requesting formation of images upon record media;
  a secondary energy saving circuit portion turned electrically off in response to activation of a secondary energy saving mode and turned on in response to de-activation of said secondary energy saving mode, said secondary energy saving mode being activated in response to reception of an energy saving signal and de-activated in response to an input of a reactivation signal by a user of said apparatus, said secondary energy saving circuit portion consuming less energy than said primary energy saving circuit portion during said formation;
  secondary energy saving key input means for enabling the user's input of said energy saving signal and said reactivation signal; and
  secondary energy saving control means for controlling activation of said secondary energy saving mode in response to said energy saving signal and said reactivation signal, said secondary energy saving control means comprising:
    first gating means for logically combining said energy saving signal with a first input signal;
    second gating means for logically combining said reactivation signal with said first input signal;
    third gating means for logically combining an output signal from said first gating means with a second input signal;
    fourth gating means for logically combining an output signal from said third gating means with a third input signal; and a flip-flop for outputting a secondary energy saving control signal to control activation of said secondary energy saving mode in response to output signals from said fourth gating means and said second gating means.

16. The energy saving image forming apparatus of claim 15, comprising:

said first gating means comprises a first OR gate;

said second gating means comprises a second OR gate;

said third gating means comprises a third OR gate; and said fourth gating means comprises an AND gate.

17. The energy saving image forming apparatus of claim 15, wherein said primary energy saving circuit portion comprises a heat lamp and a ventilating fan.

18. The energy saving image forming apparatus of claim 17, wherein said secondary energy saving circuit portion comprises:

an engine driving part for driving a plurality of components within said image forming apparatus;

an engine controller for controlling the image forming apparatus;

an image processing part for processing image data to be printed; and a heat roller temperature controller for controlling a temperature of said heat lamp.

19. A method for controlling an energy saving image forming apparatus, comprising the steps of:

performing a primary warm-up operation by supplying operating power to a secondary energy saving circuit portion of said image forming apparatus;

performing a secondary warm-up operation by supplying operating power to a primary energy saving circuit portion of said image forming apparatus, said secondary warm-up operation performed after said primary warm-up operation;

establishing a print ready state when it is determined that said image forming apparatus is capable of performing a print operation;

making a first determination as to whether a secondary energy saving key has been input;

establishing a secondary energy saving mode when said first determination indicates that said secondary energy saving key has been input, said primary and secondary energy saving circuit portions being turned off during said secondary energy saving mode;

determining whether a predetermined period of time has elapsed without a user input when said first determination indicates that said secondary energy saving key has not been input and when the imaging forming apparatus is not in an operating state;

establishing a primary energy saving mode when said predetermined period of time has elapsed without the user input, said primary energy saving circuit being turned off during said primary energy saving mode;

making a second determination as to whether said secondary energy saving key has been input after said primary energy saving mode has been established;

establishing said secondary energy saving mode when said second determination indicates that said secondary energy saving key has been input;

determining whether a wake-up operation for warming-up the image forming apparatus has been initiated when said second determination indicates that said secondary energy saving key has not been input;

performing said secondary warm-up operation when said wake-up operation has been initiated;

during said secondary energy saving mode, determining whether a reactivation key for warming-up the image forming apparatus has been input; and sequentially performing said primary warm-up operation and said secondary warm-up operation when said reactivation key has been input.

20. The method of claim 19, wherein said primary energy saving circuit portion comprises a heat lamp and a ventilating fan.

21. The method of claim 20, wherein said secondary energy saving circuit portion comprises:

an engine driving part for driving a plurality of components within said image forming apparatus;

an engine controller for controlling the image forming apparatus;

an image processing part for processing image data to be printed; and a heat roller temperature controller for controlling a temperature of said heat lamp.

22. An energy saving image forming apparatus, comprising:

primary circuit means consuming a first quantity of electrical energy during formation by the apparatus of images upon record media, for converting said electrical energy into thermal energy applied to the record media during said formation;

secondary circuit means consuming a second quantity of said electrical energy while coupled to a first node and receiving said second quantity of said electrical energy at said first node during said formation while said first quantity of said electrical energy is supplied to said primary circuit means and during a primary energy saving mode while said first quantity of said electrical energy is not supplied to said primary circuit means, said secondary circuit means for responding to reception of input data defining said images by controlling operations performed by moving components of said apparatus conveying the record media through the apparatus during said formation of images upon the record media;

tertiary circuit means consuming a third quantity of said electrical energy while coupled to a second node during said formation, during said primary energy saving mode and during a secondary energy saving mode, for controlling application of said second quantity of said electrical energy to said secondary circuit means by accommodating supply of said second quantity of said electrical energy to said secondary circuit means during said formation and during said primary energy saving mode, for controlling interruption of said application of said second quantity of said electrical energy to said secondary circuit means to establish said secondary energy saving mode, and for controlling restoration of said application of said second quantity of said electrical energy to said secondary circuit means in response to initiation of a reactivation mode;

first switching means for providing distribution and interruption of said electrical energy to said secondary circuit means in response to control by said tertiary circuit means; and second switching means for providing distribution and interruption of said electrical energy via said first switching means to said secondary circuit means, and for providing distribution and interruption of said electrical energy to said tertiary circuit means independently of said first switching means.

* * * * *

UNITED STATES PATENT AND TRADEMARK OFFICE
CERTIFICATE OF CORRECTION

PATENT NO. : 5,457,516
DATED : 10 October 1995
INVENTOR(S) : Yong-Geun Kim

It is certified that error appears in the above-indentified patent and that said Letters Patent is hereby corrected as shown below:

Column 1,

Line 25    before "office", change "modem" to --modern--:

Signed and Sealed this

Thirteenth Day of August, 1996

Attest:

BRUCE LEHMAN

Attesting Officer    Commissioner of Patents and Trademarks